(12) United States Patent
Farrar et al.

(10) Patent No.: US 11,636,278 B2
(45) Date of Patent: Apr. 25, 2023

(54) X-RAY POWERED DATA TRANSMISSIONS

(71) Applicant: HEWLETT-PACKARD DEVELOPMENT COMPANY, L.P., Spring, TX (US)

(72) Inventors: Troy A Farrar, Fort Collins, CO (US); Paul Howard Mazurkiewicz, Fort Collins, CO (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 752 days.

(21) Appl. No.: 16/482,387

(22) PCT Filed: Aug. 4, 2017

(86) PCT No.: PCT/US2017/045556
§ 371 (c)(1),
(2) Date: Jul. 31, 2019

(87) PCT Pub. No.: WO2019/027472
PCT Pub. Date: Feb. 7, 2019

(65) Prior Publication Data
US 2021/0285900 A1 Sep. 16, 2021

(51) Int. Cl.
*G06K 7/10* (2006.01)
*G06K 19/06* (2006.01)
*G06K 19/07* (2006.01)

(52) U.S. Cl.
CPC ............ *G06K 7/1099* (2013.01); *G06K 19/06* (2013.01); *G06K 19/0614* (2013.01); *G06K 19/0707* (2013.01)

(58) Field of Classification Search
CPC .. G06K 7/1099; G06K 19/06; G06K 19/0614; G06K 19/0707
USPC ...................................................... 340/568.1
See application file for complete search history.

(56) References Cited

U.S. PATENT DOCUMENTS

| | | | |
|---|---|---|---|
| 4,590,382 A | 5/1986 | Mitsuo | |
| 4,649,558 A | 3/1987 | Brunn et al. | |
| 4,918,714 A | 4/1990 | Adamski et al. | |
| 6,850,592 B2 | 2/2005 | Schramm et al. | |
| 7,303,132 B2 | 12/2007 | Knowles et al. | |

(Continued)

FOREIGN PATENT DOCUMENTS

| | | |
|---|---|---|
| CN | 104640370 | 5/2015 |
| RU | 2014127141 A | 1/2016 |
| RU | 2614984 | 4/2017 |

OTHER PUBLICATIONS

Guin, U. et al., Counterfeit Integrated Circuits: a Rising Threat in the Global Semiconductor Supply Chain, Aug. 2014.

(Continued)

*Primary Examiner* — Kerri L McNally
(74) *Attorney, Agent, or Firm* — Knobbe, Martens, Olson & Bear, LLP (57) ABSTRACT

An example system includes an x-ray absorber. The x-ray absorber is to convert received x-rays into electrical energy. The system also includes a memory. The memory is to receive the electrical energy. The memory also is to output a stored value using the electrical energy. The system includes a transmitter. The transmitter is to produce x-rays representative of the stored value.

15 Claims, 6 Drawing Sheets

(56) References Cited

U.S. PATENT DOCUMENTS

| | | | |
|---|---|---|---|
| 2004/0247080 A1* | 12/2004 | Feda | H05G 1/44 |
| | | | 378/101 |
| 2013/0026379 A1* | 1/2013 | Lohse | H01L 27/14618 |
| | | | 250/370.12 |
| 2013/0051529 A1 | 2/2013 | Basu et al. | |
| 2014/0175876 A1 | 6/2014 | Cheatham, III et al. | |
| 2015/0317501 A1 | 11/2015 | Safai et al. | |
| 2016/0113610 A1 | 4/2016 | Freudenberger | |
| 2016/0246892 A1 | 8/2016 | Murrah et al. | |
| 2017/0055923 A1* | 3/2017 | Meylan | A61B 6/032 |

OTHER PUBLICATIONS

Kegerreis, Roy. "The Heat Energy of X-Rays", Jun. 1927. Physical Review, vol. 29, No. 6, pp. 775-781. Retrieved from the Internet.
RoHS X-Ray Fluorescence Analysis (XRF) Screening, Feb. 18, 2011.

* cited by examiner

```
┌─────────────────────────────────────────────┐
│  Programming a Memory to Store Information about a  │
│                    Product                   │
│                     302                      │
└─────────────────────────────────────────────┘
                      │
                      │
┌─────────────────────────────────────────────┐
│  Attach an X-Ray Absorber, the Memory, and an X-Ray │
│            Transmitter to a Product          │
│                     304                      │
└─────────────────────────────────────────────┘
```

X-RAY POWERED DATA TRANSMISSIONS

BACKGROUND

Electromagnetic radiation occurs at many frequencies. For example, x-ray radiation is high-energy electromagnetic radiation. Due to its wavelength, x-ray radiation may interact with matter mainly by interacting with electrons associated with atomic nuclei. For example, the x-ray radiation energy may eject electrons from the atom. The electrons or the atom may scatter the x-ray radiation and may absorb energy from the scattering. X-ray radiation may penetrate an object for some distance before it interacts with matter, so the interior of objects may be imaged by detecting the interaction between the x-ray radiation and matter in the interior of the object.

DETAILED DESCRIPTION

X-ray radiation may be used to inspect products. For example, an x-ray fluorescence (XRF) spectrometer may be used to screen products for hazardous or prohibited materials. Alternatively, or in addition, x-ray radiation may be used to image the interior of a product or to image a product through packaging or containers, such as intermodal freight (IF) shipping containers. The technique of XRF spectroscopy is used widely in the electronics industry to screen products for compliance with environmental laws like RoHS (Restriction of Hazardous Substances). Because x-ray radiation can penetrate the packaging or containers, products may be imaged or screened without removing the products from the packaging or containers. As used herein, the terms "x-ray radiation" or "x-rays" refers to radiation with wavelengths less than about 10 nanometers (nm). The term "about" refers to values within 10%. X-ray radiation includes soft x-ray radiation with wavelengths of about 0.1 or 0.2 nm to 10 nm, hard x-ray radiation with wavelengths of about 5 or 10 picometers (μm) to 100 or 200 μm, and gamma radiation with wavelengths below 5 or 10 pm.

Manufacturers, suppliers, or sellers may also wish to determine information about the products or components of the products. Such parties may include bar codes indicating the information about the products or components, but the bar codes may be read by transmitting visible or near visible light to the bar code and receiving reflections. Any non-transparent layers, such as packaging or containers, may disrupt reading of the bar code. Bar codes are also subject to counterfeiting. Similarly, the product enclosure may block reading of bar codes on internal components. Alternatively, or in addition, radio frequency identification (RFID) tags may be added to the products or components. Electromagnetic radiation in the radio frequency spectrum may be transmitted to the RFID tag, which may transmit a response that includes information about the product. RF radiation may slightly penetrate some packaging or containers but may not penetrate far or with sufficient energy to power an RFID tag. Packaging or containers that include metal, such as IF shipping containers, may significantly block the transmission of RF radiation. Accordingly, the RFID tags may not work when the packaging or containers are too thick or made from particular materials. In addition, the antennas to receive the RF radiation may be too large to use with small products or individual components or may be blocked by the product enclosure.

To obtain information about products, manufacturers, suppliers, or sellers may remove the packaging or containers to obtain access to bar codes or RFID tags. However, such removal adds time and cost to processing products. Similar time and cost burdens also affect inspectors or government agencies performing customs or other inspections of products. Manufacturers, suppliers, sellers, etc. could handle products more efficiently and could obtain more detailed information about individual components by reading information about the product or components of the product without removing packaging, containers, or the product enclosure to do so.

Figure 1:
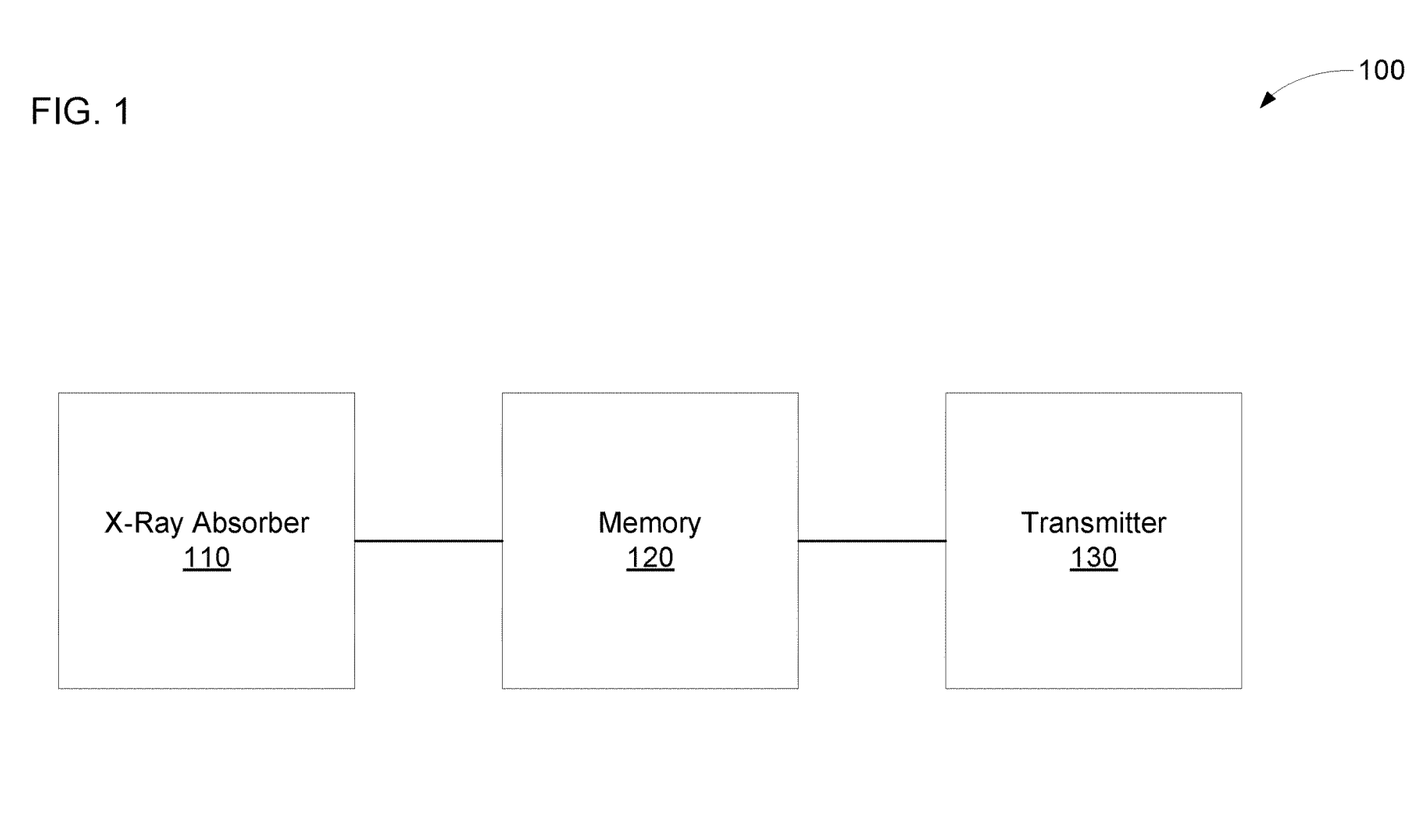
FIG. 1 is a block diagram of an example system to provide x-ray powered data transmissions.

FIG. 1 is a block diagram of an example system 100 to provide x-ray powered data transmissions. The system 100 includes an x-ray absorber 110. The x-ray absorber 110 may convert received x-rays into electrical energy. For example, a user may transmit x-rays towards the system. The user may transmit the x-rays towards the system to read information from the system or as part of another process. The x-rays may impinge on the x-ray absorber 110, and the x-ray absorber 110 may convert the x-rays directly or indirectly into electrical energy. The x-ray absorber 110 may include the x-ray absorbers of any of FIGS. 2A-2C.

The system 100 may include a memory 120. The memory 120 may include a non-volatile computer-readable medium (e.g., a magnetic storage device, an optical storage device, a paper storage device, flash memory, read-only memory, non-volatile RAM, etc.), and/or the like. In some examples, the memory 120 may include an engine to interface with the non-volatile computer-readable medium. As used herein, the term "engine" refers to hardware (e.g., a processor, such as an integrated circuit or other circuitry; analog circuitry; antennas; etc.) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The memory 120 may be electrically coupled to the x-ray absorber 110. The memory 120 may receive the electrical energy generated by the x-ray absorber 110 from the impinging x-rays. The memory 120 may output a stored value using the electrical energy. For example, the electrical energy may power the engine or the non-volatile computer-readable medium to read a stored value from the non-volatile computer-readable medium and output the stored value.

The system 100 may include a transmitter 130. The transmitter 130 may be communicatively coupled to the memory 120. The transmitter 130 may also be electrically coupled to the x-ray absorber. The transmitter 130 may produce x-rays representative of the stored value. For example, the memory 120 may output the stored value to the transmitter 130, which may transmit a signal representative of the stored value using x-ray radiation. The transmitter 130 may receive electrical energy from the x-ray absorber and use the received electrical energy to power transmission of the x-ray radiation. The transmitter 130 may produce the x-rays at a frequency lower than a frequency of the x-rays received by the x-ray absorber 110. Transmitting at a lower frequency may reduce the amount of energy used by the transmitter 130 to transmit the signal. The transmitter 130 may include the transmitters of any of FIGS. 6A-6C.

Figure 2A:
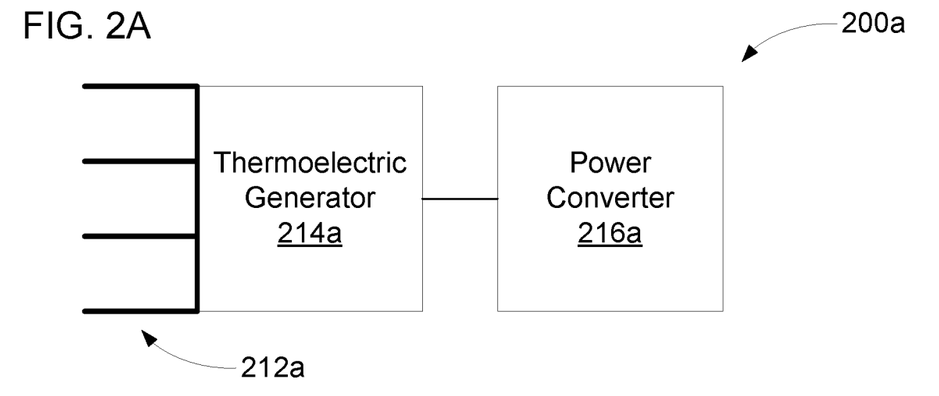
FIG. 2A is a schematic diagram of an example x-ray absorber to convert x-rays into electrical energy.

FIG. 2A is a schematic diagram of an example x-ray absorber 200a to convert x-rays into electrical energy. The x-ray absorber 200a may include a heat generator 212a to convert the x-rays into thermal energy. The heat generator 212a may receive energy from the x-rays via photoabsorption, Compton scattering, or the like and convert the received energy into thermal energy. For example, the heat generator 212a may allow electrical energy (e.g., free electrons or holes) generated by the impinging x-rays to dissipate internally to produce the thermal energy (e.g., due to diffusion or recombination of the free electrons or holes). The heat generator 212a may be electrically insulated to prevent electrical energy from leaving the heat generator 212a. The heat generator 212a may be shaped to minimize scattering of incident x-rays away from the heat generator 212a. In the illustrated example, the heat generator 212a may include a plurality of concave receiving elements, which may be impinged by incident x-ray radiation (e.g., x-ray radiation transmitted towards the x-ray absorber 200a by a user). In other examples, the heat generator 212a may include a single receiving element, or the receiving element may be another shape, such as flat, convex, or the like. The illustrated heat generator 212a may include receiving elements that are deeper than they are wide. The concave shape and the larger depth than width may increase the likelihood that a scattered x-ray impinges on another portion of the heat generator 212a rather than scattering away from the heat generator 212a into the ambient environment.

The material and thickness of the heat generator 212a may also be selected to maximize the amount of energy converted into thermal energy by the heat generator 212a. For example, materials with higher atomic numbers or higher densities may be more likely to absorb energy from the x-rays than materials with lower atomic number or lower densities. Accordingly, in some examples, the heat generator 212a may include a metal, a high atomic number semiconductor, or the like. The material may be selected to maximize energy absorption while avoiding hazardous or prohibited materials. Thicker materials may be more likely to absorb energy from the x-rays than thinner materials. The x-rays may pass through thinner materials with minimal interaction with the material. The heat generator 212a may have a thickness selected to derive sufficient energy from the x-rays without having an undue size or weight.

The heat generator 212a may be thermally coupled to a thermoelectric generator 214a. For example, the heat generator 212a may be in direct contact with a hot side of the thermoelectric generator 214a, or the heat generator 212a may be indirectly coupled to the thermoelectric generator 214a, such as through a heat pipe. In some examples, the heat generator 212a may include a first material to absorb x-rays and a second material to thermally conduct thermal energy to the thermoelectric generator 214a. For example, the first material may include an inexpensive semiconductor, metal, high atomic number element, or the like, and the second material may include a more expensive but better thermally conducting material. The thermoelectric generator 214a may convert a temperature difference between a hot side thermally coupled to the heat generator 212a and a cold side into electrical energy. The cold side of the thermoelectric generator 214a may be coupled to the ambient environment. The cold side may be coupled to a heat sink, exposed to ambient air, or the like. Generators other than thermoelectric generators may be used in some examples. For example, the thermal energy may drive motion in a microelectromechanical system (MEMS) that includes an electrical generator to convert the motion into electrical energy.

The x-ray absorber 200a may include a power converter 216a electrically coupled to the thermoelectric generator 214a. The power converter 216a may step up or step down the voltage from the thermoelectric generator 214a. The power converter 216a may combine energy received from multiple sources, such as multiple thermoelectric generators or multiple varied sources. The power converter 216a may charge an energy storage device, such as a capacitor or inductor, with the electrical energy from the thermoelectric generator 214a or may deliver the electrical energy when the amount of stored energy exceeds a threshold. The power converter 216a may be electrically coupled to a memory (not shown) and may deliver the electrical energy to the memory.

Figure 2B:
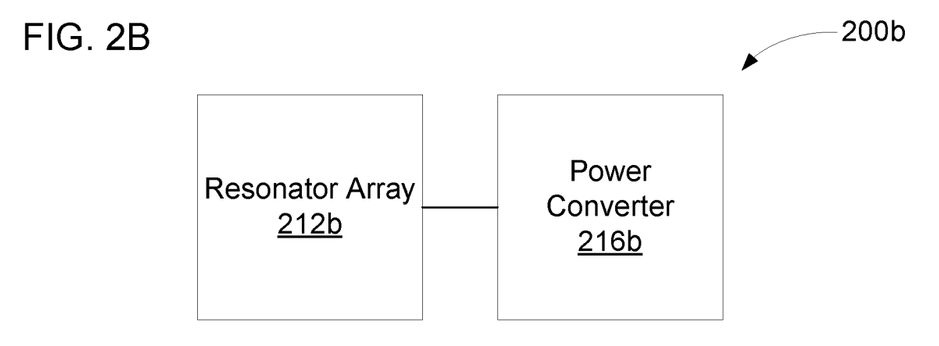
FIG. 2B is a schematic diagram of another example x-ray absorber to convert x-rays into electrical energy.

FIG. 2B is a schematic diagram of another example x-ray absorber 200b to convert x-rays into electrical energy. The x-ray absorber 200b may include a resonator array 212b. The resonator array 212b may include a plurality of resonators that resonate at the frequency of the x-rays and convert the x-rays into electrical energy. For example, the resonator array 212b may include a plurality of antennas, such as dipole antennas, loop antennas, monopole antennas, directional antennas, or the like. The antennas may be sized to resonate when exposed to x-rays. For example, the antennas may have sizes corresponding to macro antenna sizes of $\lambda/2$, $5\lambda/4$, $3\lambda/2$, $(4*n+1)\lambda/4$, $(2*n+1)\lambda/2$, $(4*n+3)\lambda/4$, etc. The antennas may be smaller in size as measured by wavelength than their macro counterparts due to limited conductance of materials at such small size scales. Accordingly, the antennas may correspond to the macro antenna sizes if they would be that length but for the limited conductance. The antennas may have a size corresponding to more than one wavelength to allow the antennas to be affordably fabricated. In some examples, the resonator array 212b may be a single antenna, such as an antenna with a plurality of elements, an antenna with a single element, etc.

The x-ray absorber 200b may include a power converter 216b. The power converter 216b may be electrically coupled to the resonator array 212b and receive electrical energy induced in the resonator array 212b by the x-rays. The power converter 216b may rectify the energy received from the resonator array 212b. The power converter 216b may also combine energy from the plurality of antennas of the resonator array 212b. The power converter 216b may also step up or step down the voltage resulting from rectification or step up or step down the voltage received from the resonator array 212b. Like power converter 216a, the power converter 216b may include energy storage devices or deliver the energy once a threshold is exceeded. The power converter 216b may be electrically coupled to a memory (not shown) and may deliver the electrical energy to the memory.

Figure 2C:
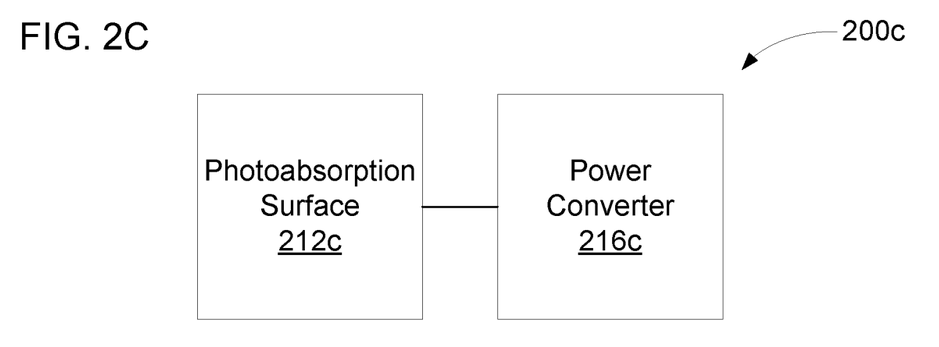
FIG. 2C is a schematic diagram of still another example x-ray absorber to convert x-rays into electrical energy.

FIG. 2C is a schematic diagram of still another example x-ray absorber 200c to convert x-rays into electrical energy. The x-ray absorber 200c may include a photoabsorption surface 212c to convert x-rays into electrical energy. The photoabsorption surface 212c may receive energy from photoabsorption, Compton scattering, or the like and may convert the received energy into free electrons or holes. For example, the photoabsorption surface 212c may include a semiconductor (e.g., a doped semiconductor) in which the received energy may be converted to an electrical potential due to diffusion of the free electrons or holes. The semiconductor may also or instead convert the x-rays into thermal energy from dissipation of the electrical energy generated by the x-rays, and the semiconductor may further convert the thermal energy into an electrical potential through the thermoelectric effect. In some examples, the semiconductor may include a high atomic number (e.g., an atomic number higher than that of silicon, germanium, arsenic, etc.).

The x-ray absorber 200c may include a power converter 216c. The power converter 216c may be electrically coupled to the photoabsorption surface 212c. The power converter 216c may step up or step down the voltage from the photoabsorption surface 212c. The power converter 216c may combine electrical energy from a plurality of photoabsorption elements (e.g., a plurality of semiconductors). In some examples, the photoabsorption surface 212c may be in contact with a thermoelectric generator (e.g., directly or indirectly through a heat conductor), which may turn heating of the photoabsorption surface 212c into additional electrical energy (e.g., the heat generator 212a may also be the photoabsorption surface 212c). The power converter 216c may combine the electrical energy from the photoabsorption surface 212c and the thermoelectric generator. The power converter 216c may include energy storage devices or deliver the energy once a threshold is exceeded. The power converter 216c may be electrically coupled to a memory (not shown) and may deliver the electrical energy to the memory.

Figure 3:
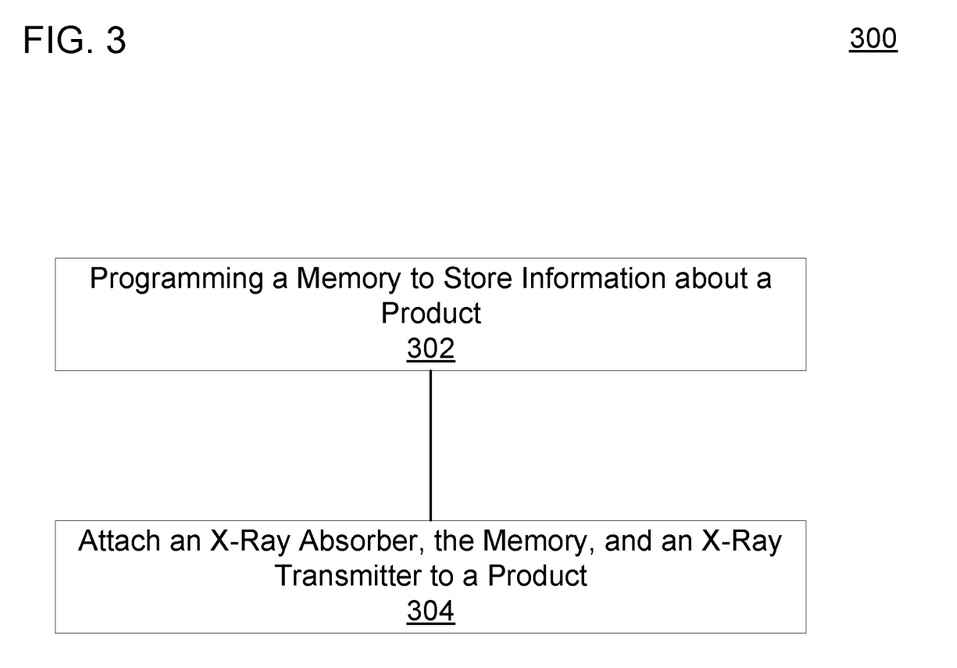
FIG. 3 is a flow diagram of an example method to provide a product with an x-ray powered memory.

FIG. 3 is a flow diagram of an example method 300 to provide a product with an x-ray powered memory. At block 302, the method 300 may include programming a memory to store information about a product. For example, the information about the product may have been encoded, and the encoded information may be written to the memory. The memory may be electrically coupled to an x-ray absorber and a transmitter, such as by wires. The transmitter may be able to produce x-rays representative of the stored information in the memory.

At block 304, the method 300 may include attaching the x-ray absorber, the memory, and the transmitter to the product. In some examples, the x-ray absorber, the memory, and the transmitter may be manufactured on a substrate or attached to a substrate. Attaching the x-ray absorber, the memory, and the transmitter to the product may include attaching the substrate to the product. Attaching may include directly or indirectly, temporarily or permanently, mechanically or chemically attaching the x-ray absorber, memory, transmitter, or substrate to the product. Referring to FIG. 1, in an example, a user may program the memory 120 (e.g., using a processor) and attach the x-ray absorber 110, the memory 120, and the transmitter 130.

Figure 4:
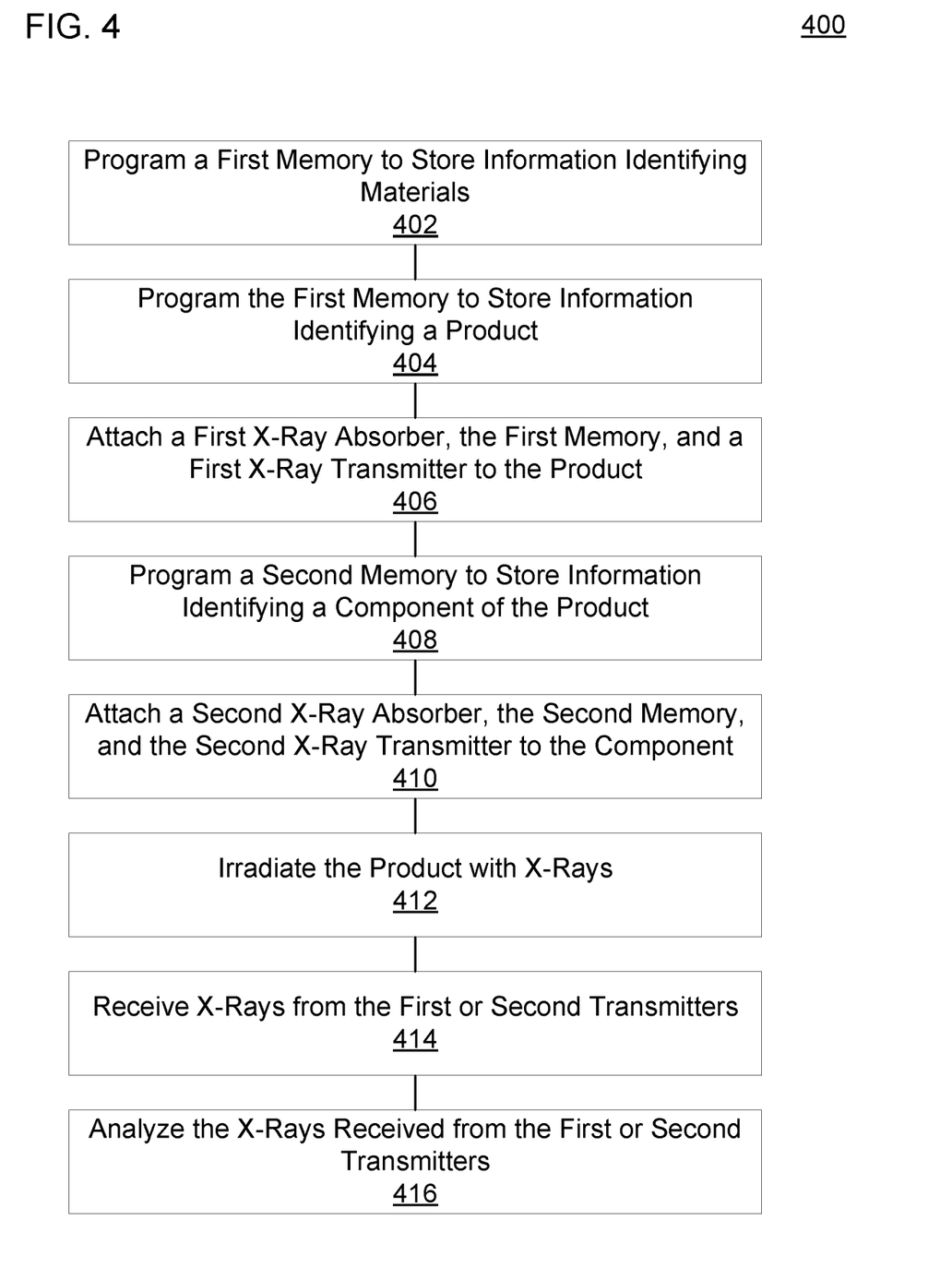
FIG. 4 is a flow diagram of another example method to provide a product with an x-ray powered memory.

FIG. 4 is a flow diagram of another example method 400 to provide a product with an x-ray powered memory. At block 402, the method 400 may include programming a first memory to store information about a product. For example, programming the first memory may include programming the first memory to store information identifying materials present in the product. Manufacturers, suppliers, sellers, etc. may wish to ensure the authenticity of products in addition to ensuring they do not contain hazardous or prohibited materials. Accordingly, a match between information identifying the materials and the actual materials detected, e.g., by a XRF spectrometer, may provide evidence that the product is authentic.

In some examples, the first memory may include an interface. Programming the first memory to store the information identifying the materials may include encoding the information or providing the information to the interface with an instruction to write the information to a storage location, which may or may not be explicitly indicated in the instruction. The information may be encoded by using a bit to represent each element or compound present, by using a predetermined mapping between encoded representations and materials present, or the like. In examples, the first memory may not include the interface, and programming the first memory may include directly manipulating storage locations to store the desired values (e.g., blowing fuses/antifuses or the like).

Block 404 may include programming the first memory to store additional information about the product. For example, programming the first memory may include programming the first memory to store information identifying a product. The information identifying the product may include a serial number, an identification number, a product number, or the like. The information identifying the product may include a name (e.g., a brand name, manufacturer name, etc.), text, or the like. Programming the first memory may include encoding the information identifying the product prior to storage. For example, the identifying information may be compressed, common portions of the information may be omitted, a predetermined mapping between information and its encoded representation may be used, or the like. The first memory may be electrically coupled to a first x-ray absorber and a first x-ray transmitter. The first x-ray transmitter may be able to produce x-rays representative of the stored information in the first memory (e.g., the information identifying materials, the information identifying the product, etc.).

At block 406, the method 400 may include attaching the first x-ray absorber, the first memory, and the first x-ray transmitter to the product. For example, the first x-ray absorber, the first memory, or the first x-ray transmitter may be manufactured on or attached to a substrate. The first x-ray absorber, first memory, first x-ray transmitter, substrate, etc. may be directly or indirectly, permanently or temporarily, mechanically or chemically attached to the product. The first x-ray absorber, first memory, first x-ray transmitter, substrate, etc. may be attached to an interior of the product or an exterior of the product. For example, the first x-ray absorber, the first memory, and the first x-ray transmitter may integrated into or attached to a motherboard in an electronic device. The first x-ray absorber, the first memory, and the first x-ray transmitter may be obfuscated or may not be accentuated relative to the product.

Block 408 may include programming a second memory to store information about a component of the product. For example, the second memory may be programmed to store information identifying the component, to store information identifying materials present in the component, or the like. Programming the second memory may include encoding the information prior to storage of the information or writing the encoded information to the second memory, for example, by instructing an interface to store the information, by directly manipulating storage location to store the information, or the like. The second memory may be electrically coupled to a second x-ray absorber and a second x-ray transmitter. The second x-ray transmitter may be able to produce x-rays representative of the stored information in the second memory (e.g., the information identifying materials, the information identifying the component, etc.).

Block 410 may include attaching the second x-ray absorber, the second memory, and the second x-ray transmitter to the component. In some examples, the second x-ray absorber, the second memory, or the second x-ray transmitter may be integrated into the component. For example, the second x-ray absorber, the second memory, or the second x-ray transmitter may be manufactured on a motherboard, substrate, die, or the like included in the component, which motherboard, substrate, die, or the like may perform other additional functionality. In some examples, the second x-ray absorber, the second memory, or the second x-ray transmitter may be included in a package or enclosure of the component but may be distinct from an internal motherboard, substrate, die, or the like.

At block 412, the method 400 may include irradiating the product or the component with x-rays. In an example, a user may irradiate the product or component with an XRF spectrometer, for example, to determine materials present in the product or component, or scan a package or container using x-rays to determine the contents of the package or container. The product or component may be irradiated with x-rays incidentally during irradiation by the XRF spectrometer or x-ray scanning. In some examples, the product or component may be deliberately targeted with x-rays to provide energy to the x-ray absorber. The x-ray absorber may most efficiently convert x-rays at a particular wavelength or in a particular range of wavelengths. The wavelength of the transmitted x-rays may be selected to be at that particular wavelength or in that particular range of wavelengths. In an example, the x-ray absorber may be designed to absorb x-ray energy in the wavelengths used by an XRF spectrometer or during x-ray scanning.

At block 414, the method 400 may include receiving x-rays from the first and second transmitters. For example, the first or second x-ray absorber may convert the x-rays irradiating the product or component into electrical energy, the first or second memory may use the electrical energy to output a stored value, and the first or second x-ray transmitter may transmit the stored value. The user may listen for the transmissions from the first or second x-ray transmitter using a sensor. For example, the XRF spectrometer or x-ray scanning equipment may include a sensor for receiving or measuring the emitted x-rays after interaction with the product or component. In some examples, the user may listen with a device specifically designed to receive the transmissions from the first or second x-ray transmitter.

At block 416, the method 400 may include analyzing the x-rays received from the first or second transmitters. For example, the stored information from the first or second memory may have been encoded before being stored, and it may be further encoded in the transmission from the first or second x-ray transmitter. Analyzing the received x-rays may include decoding the transmission to produce a representation of the stored information. The representation of the stored information may be further decoded to produce, in a format readable by the user, the information about the product or component, such as the identifying information, the information about the materials contained in the product or component, or the like. In an example, the materials identified by an XRF spectrometer may be compared to the materials identified in the information encoded in the x-ray transmissions to determine whether they match. A user may be notified of whether the materials match or alerted if they do not match. For example, the x-ray absorber 110 of FIG. 1 may be the first or second x-ray absorber, the memory 120 may be the first or second memory, and the transmitter 130 may be the first or second x-ray transmitters. A user may perform or may instruct a processor to perform the programming, attaching, irradiating, receiving, or analyzing.

Figure 5:
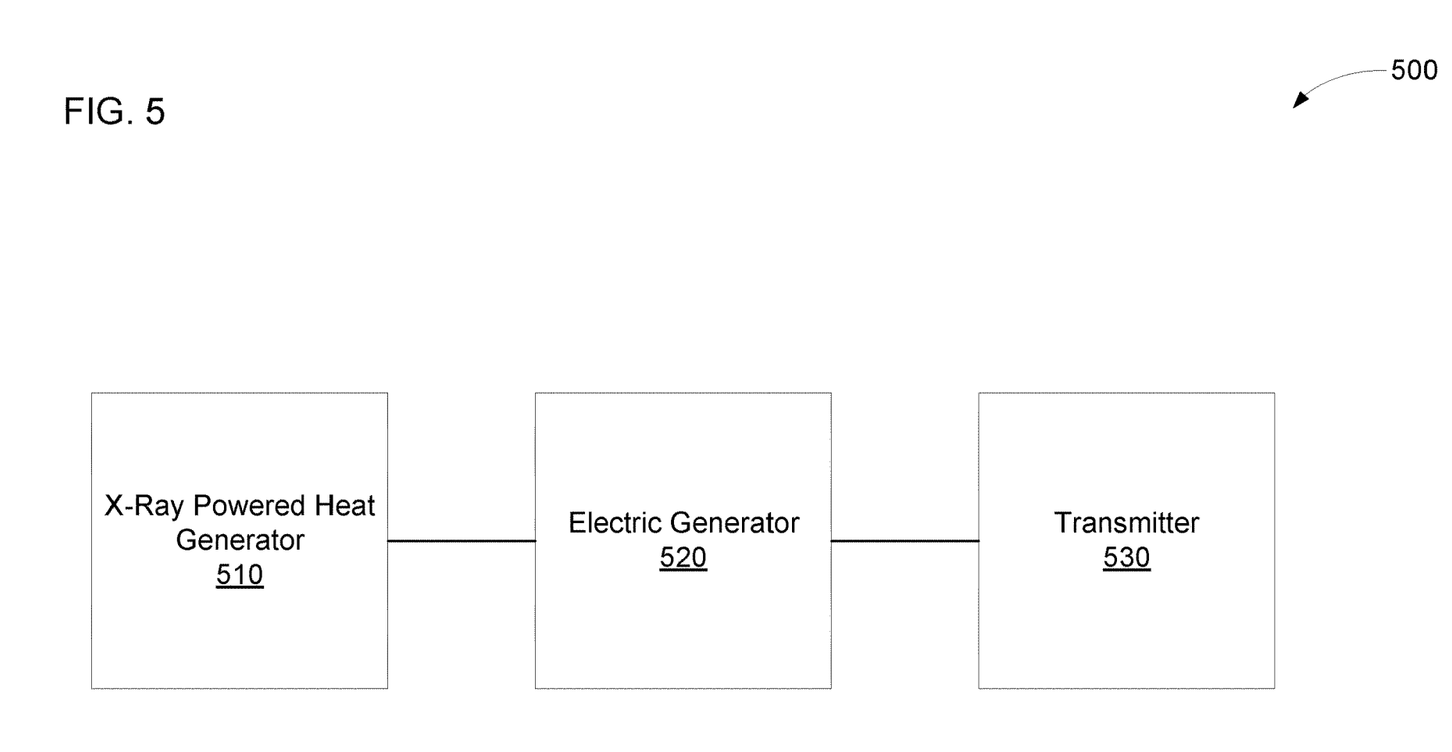
FIG. 5 is a block diagram of an example device to provide x-ray powered data transmissions.

FIG. 5 is a block diagram of an example device 500 to provide x-ray powered data transmissions. The device 500 may include a heat generator 510 to convert incident x-rays into thermal energy. For example, a user may transmit x-rays towards the heat generator 510. The heat generator 510 may receive electrical energy from the x-rays, for example, from photoabsorption, Compton scattering, or the like. The heat generator 510 may transform the electrical energy into thermal energy, for example, through internal dissipation of the electrical energy. The heat generator 510 may include any of the heat generators discussed in previous examples.

The device may also include an electric generator 520 to convert the thermal energy into electrical energy. As used herein, the term "electric generator" refers to a device to convert energy from a first form to electrical energy. The first form may include thermal energy, kinetic energy (e.g., motion), or the like. The electric generator 520 may be thermally coupled to the heat generator 510 to receive the thermal energy from the heat generator. The electric generator 520 may include a thermoelectric generator, a MEMS to convert thermal energy into motion, an electrical generator to convert motion into electrical energy, or the like.

The device may include a transmitter 530. The transmitter 530 may be powered by the electrical energy produced by the electric generator 520. For example, the transmitter 530 may be electrically coupled to the electric generator 520 to receive the electrical energy. The transmitter 530 may read a stored value. For example, the transmitter 530 may read the stored value from a memory (e.g., a nonvolatile, non-transitory computer readable medium). The transmitter 530 may produce electromagnetic radiation representative of the stored value. For example, the electromagnetic radiation may include electromagnetic radiation in the radio frequency spectrum, the terahertz spectrum, the infrared spectrum, the visible light spectrum, the ultraviolet spectrum, the x-ray spectrum, etc. The transmitter 530 may include the transmitters of any of FIGS. 6A-6C.

Figure 6A:
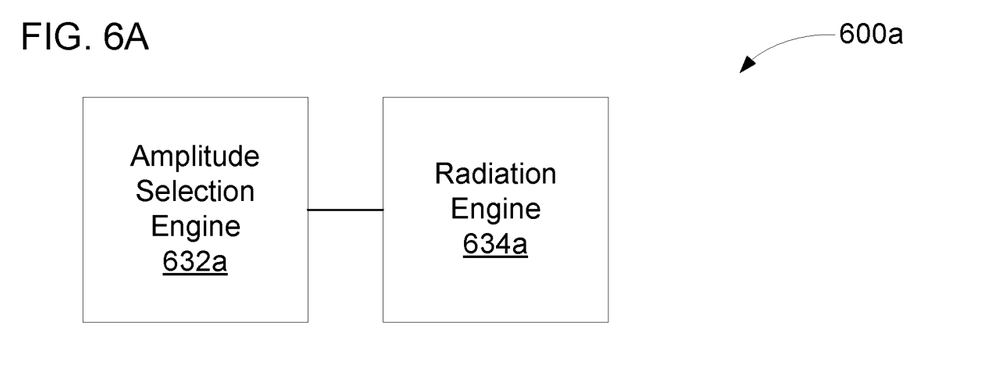
FIG. 6A is a block diagram of an example transmitter to produce electromagnetic radiation representative of a stored value.

FIG. 6A is a block diagram of an example transmitter 600a to produce electromagnetic radiation representative of a stored value. The transmitter 600a may produce x-rays at a constant amplitude representative of the stored value. The transmitter 600a may include an amplitude selection engine 632a. The amplitude selection engine 632a may receive an indication of the stored value, for example, from a memory. The amplitude selection engine 632a may determine an amplitude corresponding to the stored value. For example, there may be a mapping between stored values and amplitudes, the amplitude may be proportional to the magnitude of the stored value, or the like. A stored value of zero may be represented by a nonzero amplitude.

The transmitter 600a may include a radiation engine 634a. The radiation engine 634a may produce electromagnetic radiation at the selected amplitude. For example, the radiation engine 634a may produce x-rays at the selected amplitude or may produce electromagnetic radiation in another portion of the electromagnetic spectrum. The radiation engine 634a may be communicatively coupled to the amplitude selection engine 632a to receive an indication of the selected amplitude. In some examples, the radiation engine 634a may mix an analog indication of the selected amplitude with a signal to be radiated, may include an amplitude adjustment circuit controlled by an analog or digital indication of the selected amplitude, or the like. The radiation engine 634a may produce a reference signal to which the signal with the selected amplitude can be compared. For example, the radiation engine 634a may emit the reference signal at a different frequency than the signal with the selected amplitude, at a different time (e.g., before or after) the signal with selected amplitude, or the like. The radiation engine 634a may include an emitter, such as an antenna, a particle accelerator with or without a target for accelerated particles, or the like. The radiation engine 634a may produce heat, which may be recycled to a generator, such as a generator discussed in any of the previous examples.

Figure 6B:
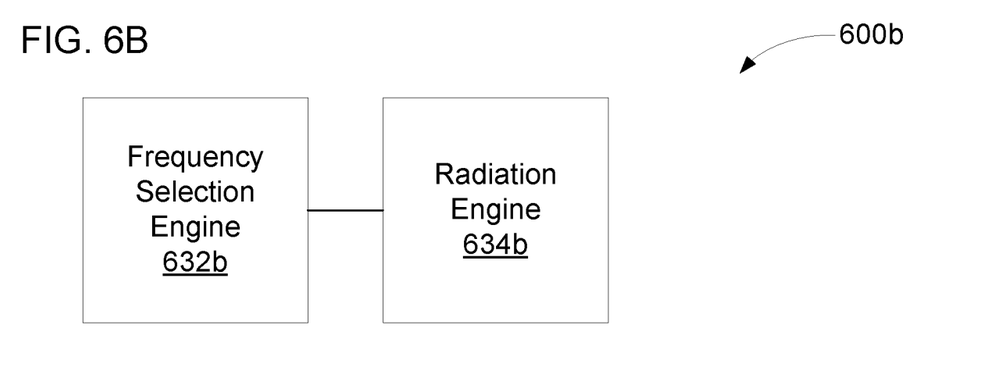
FIG. 6B is a block diagram of another example transmitter to produce electromagnetic radiation representative of a stored value.

FIG. 6B is a block diagram of another example transmitter 600b to produce electromagnetic radiation representative of a stored value. The transmitter 600b may produce x-rays at a constant frequency representative of the stored value. The transmitter 600b may include a frequency selection engine 632b. The frequency selection engine 632b may receive an indication of the stored value, for example, from a memory. The frequency selection engine 632b may determine a frequency corresponding to the stored value. For example, there may be a mapping between stored values and frequencies, the frequency may be proportional to the magnitude of the stored value plus an offset, or the like. In some examples, an XRF spectrometer may read the transmissions by the transmitter 600b by identifying the frequency of the transmission by the transmitter 600b. The selected frequencies may be frequencies detectable by the XRF spectrometer.

The transmitter 600b may include a radiation engine 634b. The radiation engine 634b may produce electromagnetic radiation at the selected frequency. For example, the radiation engine 634b may produce x-rays at the selected frequency or may produce electromagnetic radiation in another portion of the electromagnetic spectrum. The radiation engine 634b may be communicatively coupled to the frequency selection engine 632b to receive an indication of the selected frequency. In some examples, the radiation engine 634b may include a voltage controlled oscillator (e.g., a voltage controlled x-ray emitter), may include a circuit controlled by an analog or digital indication of the selected frequency, or the like. The radiation engine 634b may produce a reference signal (e.g., at a reference frequency) to which the signal with the selected frequency can be compared. The radiation engine 634b may include an emitter, such as an antenna, a particle accelerator with or without a target for accelerated particles, or the like. The radiation engine 634b may produce heat, which may be recycled to a generator, such as a generator discussed in any of the previous examples.

Figure 6C:
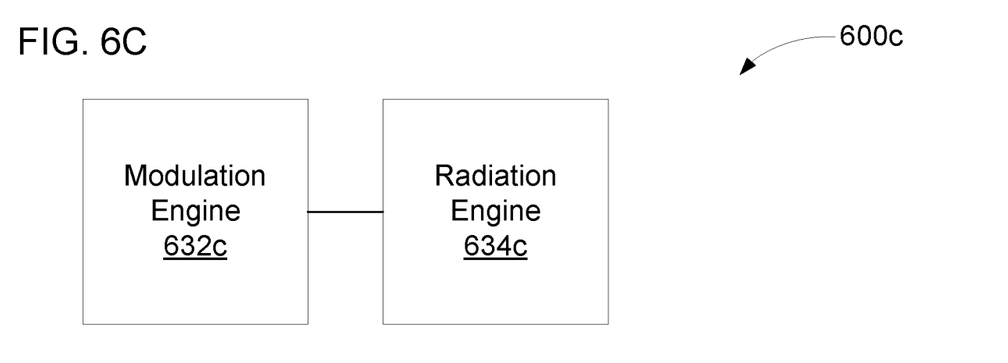
FIG. 6C is a block diagram of still another example transmitter to produce electromagnetic radiation representative of a stored value.

FIG. 6C is a block diagram of still another example transmitter 600c to produce electromagnetic radiation representative of a stored value. The transmitter 600c may produce modulated x-rays representative of the stored value. The transmitter 600c may include a modulation engine 632c. The modulation engine 632c may receive an indication of the stored value, for example, from a memory. The modulation engine 632c may determine an encoding representative of the stored value, for example, by determining a plurality of symbols corresponding to the stored value. For example, the modulation engine 632c may map a portion of the stored value to a symbol based on a predetermined mapping. The modulation engine 632c may generate a signal including the plurality of symbols, for example, at a baseband, low, or intermediate frequency. The modulation engine 632c may generate a signal that also includes a training sequence, a header, parity or error correcting information, or the like. The modulation engine 632c may modulate the signal using an amplitude modulation or keying, a frequency modulation or keying, a phase shift keying, a quadrature amplitude modulation, or the like.

The transmitter 600c may include a radiation engine 634c. The radiation engine 634c may produce electromagnetic radiation that includes the modulated signal. For example, the radiation engine 634c may produce x-rays that include the modulated signal or may produce electromagnetic radiation in another portion of the electromagnetic spectrum. The radiation engine 634c may be communicatively coupled to the modulation engine 632c. For example, the radiation engine 634c may receive the signal generated by the modulation engine 632c, for example, at the baseband, low, or intermediate frequency. The radiation engine 634c may mix or step up a frequency of the modulated signal to produce a modulated signal at the transmission frequency, may control an emitter with the modulated signal, or the like. The radiation engine 634c may include an emitter, such as an antenna, a particle accelerator with or without a target for accelerated particles, or the like which may transmit the modulated signal at the transmission frequency. The transmitted signals may be received, demodulated, and decoded to determine the stored value. The radiation engine 634c may produce heat, which may be recycled to a generator, such as a generator discussed in any of the previous examples.

In some examples, the transmitters 600a-c (e.g., the frequency selection engine 632b) may transmit at (e.g., select) a frequency distinct from spectroscopic emission frequencies. The transmitters 600a-c may transmit at (e.g., select) a frequency that does not correspond to materials in the product, does not correspond to hazardous or prohibited materials, does not correspond to any known materials, or the like. The transmitters 600a-c may be active while an XRF spectrometer is irradiating a product and measuring the response. Avoiding spectroscopic emission frequencies may prevent the XRF spectrometer from misidentifying a material based on transmissions from the transmitters 600a-c or may prevent spectroscopic emissions of materials irradiated by the XRF spectrometer from interfering with transmissions from the transmitters 600a-c.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system comprising:
   an x-ray absorber to convert received x-rays into electrical energy;
   a memory to:

receive the electrical energy, and
output a stored value using the electrical energy; and
a transmitter to produce x-rays representative of the stored value.

2. The system of claim 1, wherein the x-ray absorber comprises:
a heat generator to convert the x-rays into thermal energy, and
a thermoelectric generator to convert the thermal energy into the electrical energy.

3. The system of claim 1, wherein the x-ray absorber comprises a resonator.

4. The system of claim 1, wherein the transmitter produces the x-rays at a frequency lower than a frequency of the received x-rays.

5. The system of claim 1, wherein the x-ray absorber comprises a photoelectric element to generate an electric charge from the x-rays.

6. A method, comprising:
programming a memory to store information about a product, the memory electrically coupled to an x-ray absorber and a transmitter, the transmitter to produce x-rays representative of the stored information; and
attaching the x-ray absorber, the memory, and the transmitter to the product.

7. The method of claim 6, wherein programming the memory comprises programming the memory to store information identifying materials present in the product.

8. The method of claim 6, wherein programming the memory comprises programming the memory to store information identifying the product.

9. The method of claim 6, wherein programming the memory comprises programming the memory to store information identifying a component of the product, and wherein attaching the x-ray absorber, the memory, and the transmitter comprises attaching the x-ray absorber, the memory, and the transmitter to the component.

10. The method of claim 6, further comprising irradiating the product with x-rays and receiving the x-rays produced by the transmitter at a frequency distinct from spectroscopic emission frequencies.

11. A device comprising:
a heat generator to convert incident x-rays into thermal energy;
an electric generator to convert the thermal energy into electrical energy;
a transmitter powered by the electrical energy, the transmitter to:
read a stored value, and
produce electromagnetic radiation representative of the stored value.

12. The device of claim 11, wherein the heat generator is shaped to minimize scattering of the incident x-rays away from the heat generator.

13. The device of claim 11, wherein the transmitter is to produce x-rays at a constant frequency or constant amplitude representative of the stored value.

14. The device of claim 11, wherein the transmitter is to produce modulated x-rays representative of the stored value.

15. The device of claim 11, the transmitter is to produce x-rays at a frequency distinct from spectroscopic emission frequencies.

* * * * *